United States Patent [19]
de Kruijff et al.

[11] Patent Number: 5,198,005
[45] Date of Patent: Mar. 30, 1993

[54] APPARATUS FOR SOLIDS-FLUID SEPARATION

[75] Inventors: Gregorius T. de Kruijff, The Hague; Arie van Hattem, Amsterdam, both of Netherlands

[73] Assignee: Shell Oil Company, Houston, Tex.

[21] Appl. No.: 554,490

[22] Filed: Jul. 19, 1990

[30] Foreign Application Priority Data

Oct. 20, 1989 [GB] United Kingdom ............... 8923684

[51] Int. Cl.$^5$ .............................................. B01D 45/12
[52] U.S. Cl. ....................................... 55/459.1; 55/349
[58] Field of Search ....................... 55/459.1, 345, 349

[56] References Cited
PUBLICATIONS

European Patent Application No. 0,206,399, published Dec. 30, 1986.

Primary Examiner—Charles Hart

[57] ABSTRACT

Apparatus suitable for solids-fluid separation comprising upwardly directed feed inlet means of which the upper part cooperates substantially with a housing comprising at least a domed upper section, at least one fluid outlet means which is in fluid communication with a central section of the housing, and downwardly directed solids outlet means in communication with at least one solids outlet opening in a lower section of the housing, wherein at least one fluid directing means is mounted on the inner surface of the housing and encircles the fluid outlet means. The invention further relates to an improved catalytic cracking reactor comprising the above apparatus, and to a process for separating fluid catalytic cracking catalyst particles from hydrocarbon conversion products using the above apparatus.

8 Claims, 2 Drawing Sheets

APPARATUS FOR SOLIDS-FLUID SEPARATION

BACKGROUND OF THE INVENTION

The present invention relates to an apparatus for solids-fluid separation.

In European patent application no. A-0 206 399 an apparatus is described, which is in particular employed for solids-fluid separation in e.g. catalytic cracking processes, comprising upwardly directed feed inlet means of which the upper part cooperates substantially tangentially with a housing comprising at least a domed upper section, at least one fluid outlet means which is in fluid communication with a central section of the housing, and downwardly directed solids outlet means in communication with at least one solids outlet opening in a lower section of the housing. When the above apparatus is applied in a fluidized catalytic cracking process a solids-fluid separation efficiency can be obtained from about 98%.

SUMMARY OF THE INVENTION

The present invention relates to an apparatus which constitutes an improvement over the apparatus discussed hereinabove.

It has been found that the separation efficiency of the above apparatus can considerably be improved if the apparatus comprises in addition at least one fluid directing means which is mounted on the inner surface of the housing and encircles the fluid outlet means.

The present invention therefore relates to an apparatus suitable for solids-fluid separation comprising upwardly directed feed inlet means of which the upper part cooperates substantially tangentially with a housing comprising at least a domed upper section, at least one fluid outlet means which is in fluid communication with a central section of the housing, and downwardly directed solids outlet means in communication with at least one solids outlet opening in a lower section of the housing, wherein at least one fluid directing means is mounted on the inner surface of the housing and encircles the fluid outlet means.

DESCRIPTION OF PREFERRED EMBODIMENTS

Figure 2:
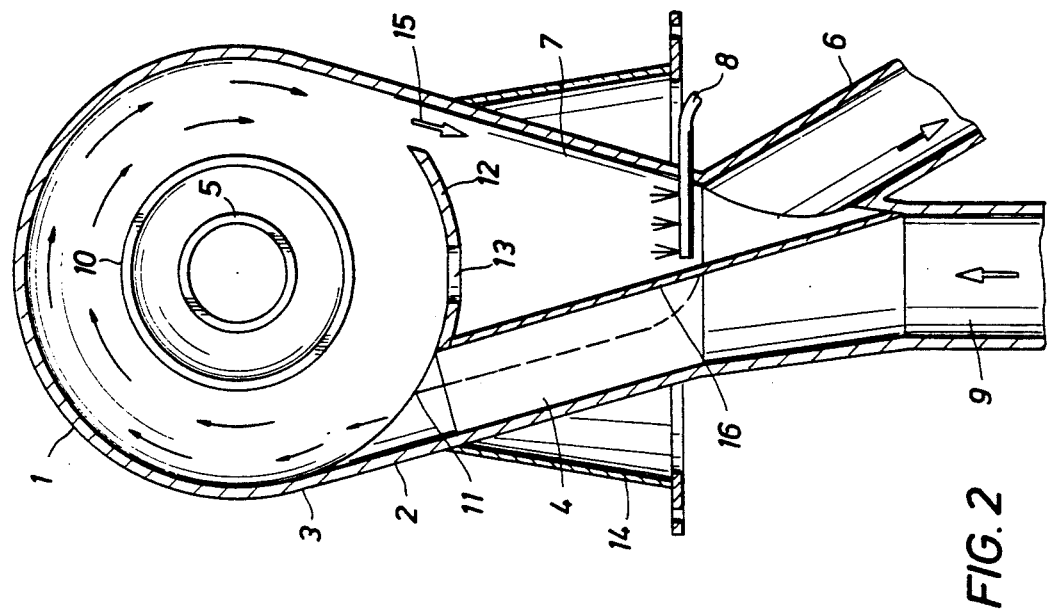

Suitably the fluid directing means encircles the fluid outlet means over less than half of its length in the housing. In a preferred embodiment of the apparatus according to the present invention the periphery of the fluid directing means protrudes from the inner surface of the housing, preferably in a substantially horizontal direction. Preferably, the fluid directing means comprises a rim which protrudes from the inner surface of the housing, preferably in a substantially horizontal direction. The fluid directing means encircles the fluid outlet means preferably symmetrically. In a particularly preferred embodiment of the apparatus according to the present invention, the fluid directing means comprises a spiral rim which is connected, preferably tangentially, to the outer surface of the fluid outlet means and which protrudes from the inner surface of the housing, preferably in a substantially horizontal direction. The present invention relates in particular to an apparatus as defined hereinabove wherein the inner contour of the fluid directing means, i.e. the contour directed to the fluid outlet means, conforms to the contour of the inner surface of the housing on which the fluid directing means is mounted.

The apparatus according to the present invention can be employed in processes wherein solids have to be separated from fluids, in particular gases, at elevated temperatures and pressures, such as catalytic cracking, shale conversion processes and coal- or heavy oil gasification.

The apparatus according to the present invention can be used as sole separation means. It is, however, also possible to combine the present apparatus with another separator of the same or different construction. So it is possible to have a series of subsequent apparatuses according to the present invention. It is also feasible to have a combination of an apparatus according to the present invention and one or more cyclones, which may be horizontal or vertical. Other separators of different construction with which the present apparatus can suitably be combined comprise the separators described in European patent application Nos.A-0 206 399, A-0 220 768 and A-0 332 277.

Preferred embodiments of the apparatus according to the present invention are illustrated hereinafter by way of FIGS. 1-3 in which reference numerals relating to corresponding parts are the same.

Figure 1:
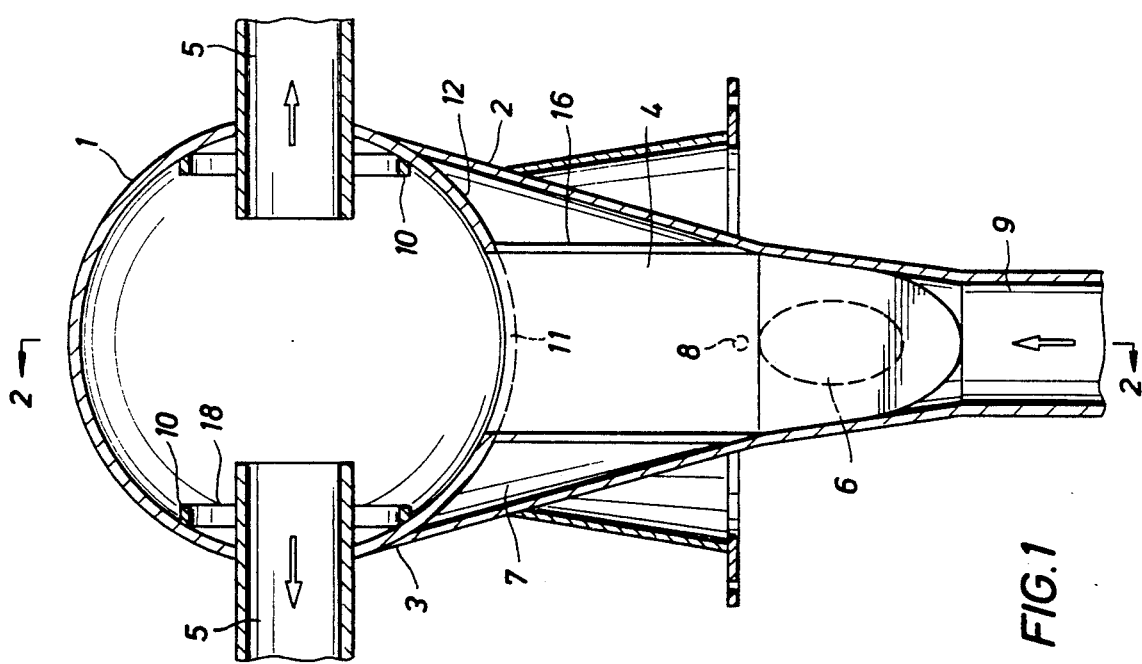

In FIG. 1 a longitudinal section of a suitable embodiment of an apparatus according to the present invention is shown.

In FIG. 2 a cross section at 2-2 of the apparatus as depicted in FIG. 1 is shown. In FIG. 3 a longitudinal section of a particularly preferred embodiment of the apparatus according to the present invention is shown.

The apparatus shown in FIG. 1 comprises a substantially spherical housing (1) provided with two fluid outlet means (5) in the central section (3) of the housing which are encircled by fluid directing means (10), and a feed inlet opening (11) and a fluid ventilation opening (13) (not shown in FIG. 1) in the lower section of the housing. The housing (1) is partially enclosed by an inverted frusto-conical supporting body (2) which is connected to a feed inlet (9). a solids outlet (6) and a frusto-conical support (14) (not shown in FIG. 1). The solids outlet (6) communicates with a solids outlet opening (15) (not shown in FIG. 1) in the lower section of the housing. The space enclosed by the supporting body (2) is divided by a wall (16) into two sections, i.e. feed inlet (4) and solids bin (7). Within solids bin (7) a gas (e.g. steam) feed means (8) is present so that interstitial and/or absorbed compounds (e.g. hydrocarbons) can be at least partly removed from the solids which have been separated in the housing (1) from the bulk of the fluid compounds leaving the housing through fluid outlet means (5). The fluid directing means (10) is mounted on the inner surface of the housing (1) and encircles the fluid outlet means (5) symmetrically over less than half of its length in the housing (1). That is, fluid directing means 10 protrudes into the space enclosed by housing 1 for a distance less than one-half the distance that fluid outlet means 5 protrudes into said space. The inner contour (18) of the fluid directing means (10), represented with a dotted line, conforms to the contour of the inner surface of the housing (1), and the fluid directing means (10) which comprises a rim protrudes from the inner surface of the housing (1) in a substantially horizontal direction.

Figure 3:
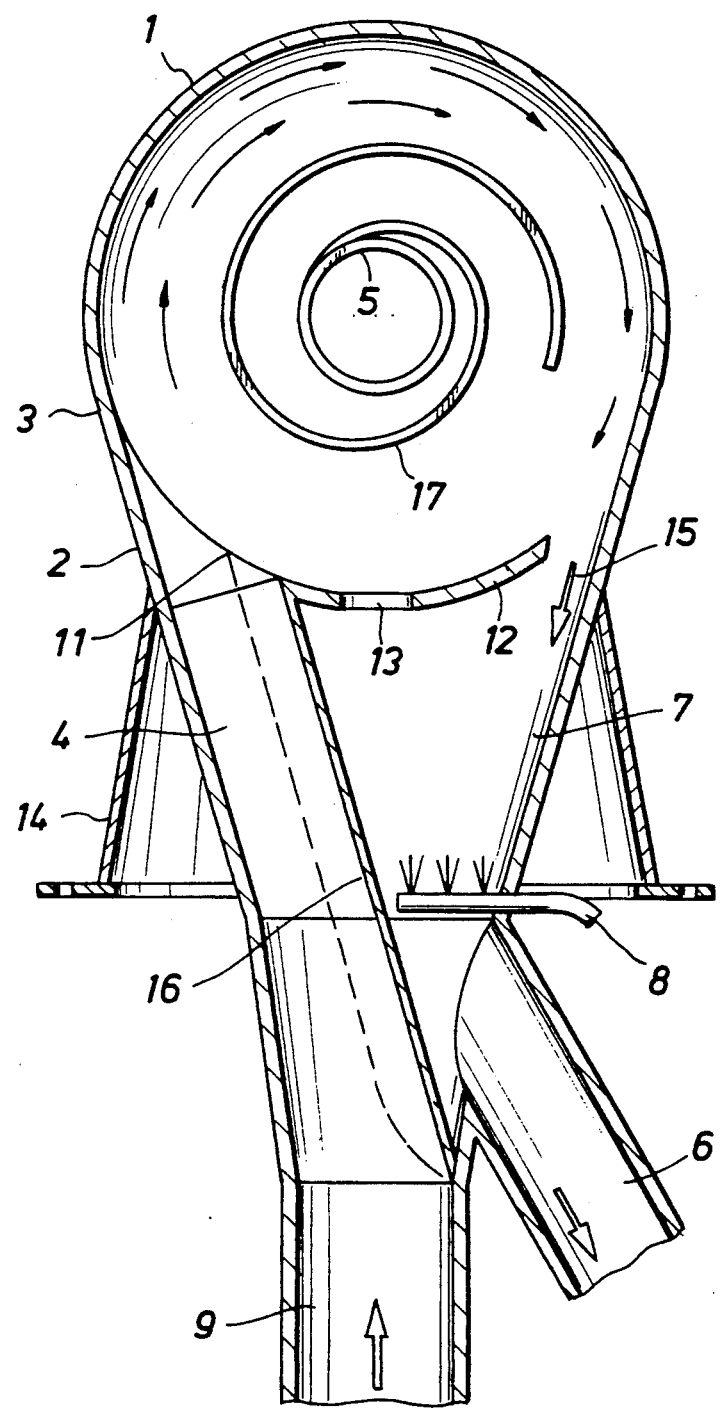

In FIG. 3 a preferred embodiment of the apparatus according to the present invention is shown wherein the fluid directing means comprises a spiral rim (17). The spiral rim (17) is mounted on the inner surface of the housing (1) and connected tangentially to the outer surface of the fluid outlet means (5). The spiral rim (17) encircles the fluid outlet means over less than half of its length in the housing (1). The inner contour of the spiral rim (17) conforms to the contour of the inner surface of the housing (1), and the spiral rim (17) protrudes from the inner surface of the housing (1) in a substantially horizontal direction.

For a detailed description of the construction and preferred embodiments of the housing we refer to the above-mentioned European patent application No. A-0 206 399.

During normal operation of the apparatus according to the present invention the (catalyst) particles enter the housing through inlet means (11), initially follow a flow path in a substantially vertical plane along the inner surface of the housing and leave the housing through solids outlet means (15) in the lower section of the housing. Incoming particles have the tendency, however, to spread out as a result of which they can miss the solids outlet means (15). These particles could then start swirling around the fluid outlet means (5) and eventually they would be entrained in the fluid outlet means (5). In order to avoid such eventual entrainment of particles in the fluid outlet means, the apparatus according to the present invention is provided with fluid directing means (10), which will direct the particles which are spreading out, towards the solids outlet means (15). In this way the separation of solids-fluid can considerably be improved. The particles overflow can be reduced up to 50%. Moreover, the fluid directing means do advantageously not have any substantially negative influence on turbulence or other process parameters.

The present invention further relates to an improved upright catalytic cracking reactor comprising an apparatus as described hereinbefore disposed within the upper part of said reactor.

Furthermore, the present invention relates to a process for separating fluid catalytic cracking catalyst particles from hydrocarbon conversion products wherein use is made of an apparatus as described hereinbefore.

The present invention will now be illustrated by means of the following Example.

EXAMPLE

A feed stream of hydrocarbon vapours and cracking catalyst particles in a weight ratio of 0.15 enters feed inlet (4) of a separation apparatus as shown in FIG. 3 at a temperature of 500° C., a pressure of 2 bar and a vapour velocity of 18 m/s. Catalyst particles are removed through solids outlet (15) with a separation efficiency of more than 99.7% on a weight basis, whereas hydrocarbon vapour streams comprising less than 0.3% on a weight of catalyst particles, based on total catalyst weight in the feed stream, leave the apparatus via fluid outlets (5).

What is claimed:

1. In an apparatus suitable for solids-fluid separation comprising (1) an upwardly directed feed inlet means of which the upper part cooperates substantially tangentially with (2) a housing comprising (3) at least a domed upper section, (4) at least one fluid outlet means which is in fluid communication with (5) a central section of the housing, and (6) downwardly directed solids outlet means in communication with at least (7) one solids outlet opening in (8) a lower section of the housing, the improvement which comprises:

at least one fluid directing means is mounted on the inner surface of the housing and encircles the fluid outlet means.

2. The apparatus according to claim 1, wherein said at least one fluid directing means encircles the fluid outlet means over less than half of its length in the housing.

3. The apparatus according to claim 1, wherein the periphery of the fluid directing means protrudes from the inner surface of the housing.

4. The apparatus according to claim 3, wherein the periphery of the fluid outlet means protrudes from the inner surface of the housing in a substantially horizontal direction.

5. The apparatus according to claim 1, wherein said fluid outlet means comprises a rim.

6. The apparatus according to claim 1, wherein said fluid directing means encircles the fluid outlet means symmetrically.

7. The apparatus according to claim 1, wherein said fluid directing means comprises a spiral rim which is connected to the outer surface of the fluid outlet means.

8. The apparatus according to claim 1, wherein said fluid directing means has an inner contour which conforms to the contour of the inner surface of the housing on which the fluid directing means is mounted.

* * * * *